United States Patent

[11] 3,542,314

| [72] | Inventor | Reimund Bey<br>Friedrichshafen, Germany |
|---|---|---|
| [21] | Appl. No. | 671,415 |
| [22] | Filed | Sept. 28, 1967 |
| [45] | Patented | Nov. 24, 1970 |
| [73] | Assignee | Dornier System G.m.b.H.,<br>Friedrichshafen, Germany<br>a corporation of limited liability of the<br>Federal Republic of Germany |
| [32] | Priority | Nov. 10, 1966 |
| [33] | | Germany |
| [31] | | No. D51506 |

[54] TEMPERATURE REGULATOR FOR SATELLITES
6 Claims, 3 Drawing Figs.

[52] U.S. Cl. .................................................. 244/1,
236/91
[51] Int. Cl. ..................................................... B64g 1/10
[50] Field of Search........................................... 244/1;
236/49, 91

[56] References Cited
UNITED STATES PATENTS

| 3,016,746 | 1/1962 | Holloway ..................... | 136/91X |
| 3,348,790 | 10/1967 | Crowder et al. .............. | 244/1(S.S.) |

FOREIGN PATENTS

| 343,017 | 1/1931 | Great Britain................ | 236/91 |

Primary Examiner—Milton Buchler
Assistant Examiner—Jeffrey L. Forman
Attorney—James E. Bryan ABSTRACT: This invention relates to a temperature regulating apparatus for a satellite having variable cooling apertures in the exterior sheathing thereof which apparatus comprises means for measuring the temperature difference with respect to the interior of the satellite on two opposite sides thereof and means for opening the cooling apertures on the side having the greatest temperature difference, whereby electronic instruments contained within the satellite are not adversely affected by extreme temperature changes.

Patented Nov. 24, 1970 3,542,314
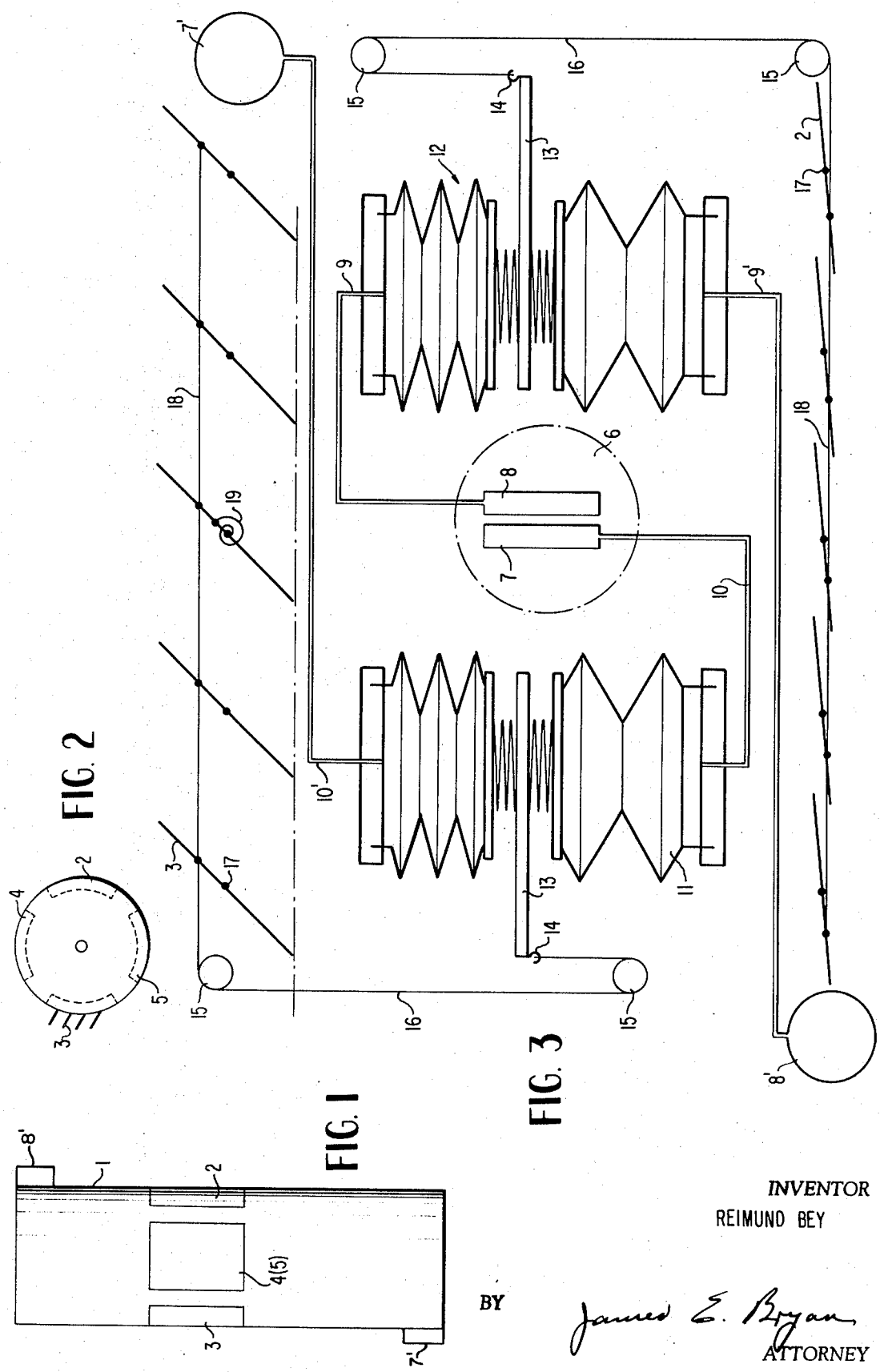
INVENTOR
REIMUND BEY
BY James E. Bryan
ATTORNEY

TEMPERATURE REGULATOR FOR SATELLITES

Temperature regulation in satellites is especially important because the compensating atmospheric layer is absent at high altitudes and the satellite will attain a temperature of, for example, about 100°C. on the side facing the sun whereas the temperature decreases to about 100°C. on the dark side. Accordingly, this high temperature difference must be compensated so that instruments contained in the satellites, for example measuring instruments or electronic equipment, are maintained at a temperature at which they properly operate.

It is known to the art to compensate for such high temperature differences by means for sector-shaped hull apertures positioned over the entire circumference of the satellite and including corresponding ventilation cover discs. Mounted in the centers of these discs are fanlike cover plates which are adapted to be rotated, if necessary, over an opening slot having the same size. Also, temperature regulator discs have been built which, while not required to cover apertures, are adapted to effect a certain temperature control by means of reflection of radiation. Since movable objects having light surfaces can reflect the heat generated by radiation of the sun while darker surfaces absorb heat, it is possible to regulate within a limited temperature range the inside temperature of a satellite merely by covering the dark areas on the surface thereof. The otherwise completely closed envelope or outer sheathing of such a satellite has the disadvantage, however, that this type of cooling is not sufficient for the electronic equipment and it has, therefore, been attempted to provide, particularly on larger satellites, louverlike flaps which permit the heat generated inside the satellite to pass through the hull to the exterior thereof.

Those satellites in which apertures are closed for cooling purposes by means of a flap or slide valve include an automatic device with a thermostat which actuates the closing member. In this case, the entire row of flaps is open when a specific temperature has been reached, irrespective of whether or not the flap is positioned in the cold portion, i.e., on the side facing away from the sun. Thus, it may happen that flaps are opened at an undesirable position thus producing the undesirable effect that the electronic instruments are cooled to an insufficient degree or not at all.

The present invention provides a temperature regulating apparatus including means for opening cooling flaps and it is ensured that the desired cooling effect occurs at any position of the satellite. This is accomplished by measuring the temperature difference on two opposite sides of the satellite with respect to the interior thereof and closable cooling apertures are opened on the side which displays the greater temperature difference.

In order to construct the temperature regulator in as simple a manner as possible, a further development of the present invention proposes the use of two regulating units which are known to the art and which include temperature sensor elements, each of which units is connected with a sensor element which determines the outside temperature and with a sensor element which determines the inside temperature of the satellite.

One embodiment of the present invention is further illustrated in the accompanying drawings in which:

FIG. 1 shows the arrangement of ventilating flaps on a satellite;

FIG. 2 is a sectional view through the satellite shown in FIG. 1; and

FIG. 3 illustrates the construction and operation of the temperature regulator according to the present invention. In FIG. 1, the ventilating flap sets 2 and 3 are installed laterally to the right and left of the satellite 1 which has a cylindrical shape, for example. It is intended to show in this FIG. merely that at least two rows of flaps must be present. As is apparent from FIG. 2, it is also advantageous to additionally provide for a pair of flap sets 4 and 5 which are offset about 90° from the sets of flaps 2 and 3 and which will open in case the satellite is in a position such that actuation of the sets of flaps 2 and 3 would be of no effect. Of course, it is also entirely possible to position several sets of flaps in series.

The construction of the temperature regulator is shown in FIG. 3. It is intended that the electronic equipment 6, for example, inside the satellite 1 be maintained at a specific temperature. Positioned at the electronic equipment 6 are two measuring probes or sensor elements 7 and 8 which determine the inside temperature and are connected with the regulating units 11 and 12 by means of the capillary tubes 9 and 10. The regulating units 11 and 12 are preferably constructed as bellowslike instruments which convert a change of pressure into motion. On the other hand, the bellowslike instruments 11 and 12, respectively, are also connected by means of the capillary tubes 9' and 10' with the outer sensors 7' and 8' which determine the exterior temperature of the satellite. Bellows instruments of this type are known to the art. Positioned in the center of each bellows instrument is a setting or regulating plate 13 to which a lever 14 is hingedly connected. Cables 16 are connected to the levers 14 and pass over the reversing rollers 15 to the flap sets 2 and 3, respectively. The flap sets 2 and 3 are rotatably mounted on the satellite, in the center of each flap, by means of the bearings 17 and include the return springs 19, only one of which is illustrated. The individual members of the flap sets 2 and 3 are connected with each other by means of belts 18.

When the satellite is in its orbital path, it is always temporarily exposed to the radiation of the sun on one side thereof. As a result, the electronic equipment 6 at the interior of the satellite is heated; the temperature sensor elements 7 and 8 determine the temperature difference in conjunction with the outside sensors 7' and 8', respectively, and give a command to the regulating units 11 and 12 to open one row of flaps, as a result of the fact that the pressure rises and is converted into motion by means of the capillary lines 9, 10, 9', 10'. The setting or regulating plate 13 will be displaced and, at the same time, moves the lever 14 in the same direction. This movement is transmitted to the connecting cable 16 which will, in turn, open the flaps while passing over the reversing rollers 15 and specifically on the side where the measured temperature difference is the greatest. When the satellite thereafter turns to the other side thereof, the procedure is repeated with the flaps on the other side. After the interior temperature has been lowered due to the opening of the flaps, for example the flaps 3, the pressure in the bellows instrument 11 is reduced and the flaps 3 are again closed.

It is thus possible to cool the measuring instruments and electronic instruments, respectively, which are temperature sensitive, to a predetermined temperature level and, on the other hand, an excessive cooling also may be effectively prevented. The features that the temperature regulator is simple in construction, operates completely maintenance-free, and, in addition, has a low weight are particularly advantageous. When cooling the measuring instruments or electronic instruments in the manner of the present invention, expensive and complicated insulation with all of the inherent difficulties thereof may be largely dispensed with. Accordingly, additional space is provided for the useful load and the satellites may be made of lighter weight.

It will be obvious to those skilled in the art that many modifications may be made within the scope of the present invention without departing from the spirit thereof, and the invention includes all such modifications.

I claim:

1. Apparatus for regulating the temperature of satellites having variable cooling apertures therein which comprises means for measuring the temperature difference with respect to the interior of the satellite on two opposite sides thereof, and temperature responsive means for varying the area of the cooling apertures on the side having the lower temperature.

2. Apparatus according to claim 1 including temperature responsive means for decreasing the area of the cooling apertures on the side having the higher temperature.

3. Apparatus according to claim 1 in which the means for measuring the temperature difference includes two sensor means for measuring the interior temperature and two sensor means for measuring the exterior temperature.

4. Apparatus according to claim 3 in which each pair of interior and exterior sensor means is connected to a bellows.

5. Apparatus according to claim 4 including mechanical means in operative connection with the bellows for varying the area of the cooling apertures.

6. Apparatus according to claim 1 in which the variable cooling apertures are formed by at least two louverlike rows of flaps oppositely positioned on the exterior sheathing of the satellite